(12) United States Patent
Asai

(10) Patent No.: US 10,025,095 B2
(45) Date of Patent: Jul. 17, 2018

(54) HEAD-UP DISPLAY AND MOBILE BODY EQUIPPED WITH HEAD-UP DISPLAY

(71) Applicant: Panasonic Intellectual Property Management Co., Ltd., Osaka (JP)

(72) Inventor: Yosuke Asai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/188,648

(22) Filed: Jun. 21, 2016

(65) Prior Publication Data

US 2016/0299342 A1 Oct. 13, 2016

Related U.S. Application Data

(63) Continuation of application No. PCT/JP2015/005491, filed on Nov. 2, 2015.

(30) Foreign Application Priority Data

Dec. 26, 2014 (JP) .................................. 2014-263761

(51) Int. Cl.
*G03F 7/20* (2006.01)
*F21V 5/00* (2018.01)
(Continued)

(52) U.S. Cl.
CPC .......... *G02B 27/0101* (2013.01); *B60K 35/00* (2013.01); *F21V 5/008* (2013.01);
(Continued)

(58) Field of Classification Search
CPC ... G02F 1/13363; G02B 7/0101; G02B 7/008; G02B 7/2214; G02B 26/10; G02B 27/2214; H04N 13/0404; G03F 7/2002
See application file for complete search history.

(56) References Cited

U.S. PATENT DOCUMENTS

| | | | | |
|---|---|---|---|---|
| 4,998,191 A | * | 3/1991 | Tejima | G03F 7/2002 362/268 |
| 8,436,952 B2 | * | 5/2013 | Fok | G03B 21/2066 349/11 |

(Continued)

FOREIGN PATENT DOCUMENTS

| | | |
|---|---|---|
| JP | 2004-053949 | 2/2004 |
| JP | 2006-310367 | 11/2006 |

(Continued)

OTHER PUBLICATIONS

International Search Report of PCT application No. PCT/JP2014/263761 dated Dec. 26, 2014.
(Continued)

*Primary Examiner* — Lin Li
(74) *Attorney, Agent, or Firm* — Wenderoth, Lind & Ponack, L.L.P.

(57) ABSTRACT

A head-up display includes light source elements arranged in a first direction, a first lens which takes in from an incident surface light emitted from the light source elements and emits the light from an emission surface. A diffusion member is disposed on a side of the emission surface of the first lens. A spatial light modulation element takes in from an incident surface the light having been emitted from the light source elements and having passed through the first lens and the diffusion member, modulates the taken-in light in accordance with image information, and emits the modulated light from an emission surface. An optical element reflects light emitted from spatial light modulation element. The first lens changes an optical path of light emitted from each of the light source elements such that it reaches the same point on the incident surface of the spatial light modulation element.

19 Claims, 10 Drawing Sheets

(51) Int. Cl.
*G02B 27/22* (2018.01)
*G02B 7/00* (2006.01)
*G02F 1/133* (2006.01)
*G02B 27/01* (2006.01)
*G01C 21/36* (2006.01)
*H04N 13/00* (2018.01)
*B60K 35/00* (2006.01)
*G02B 5/02* (2006.01)
*G02F 1/1335* (2006.01)
*G09G 3/02* (2006.01)

(52) U.S. Cl.
CPC ............ *G02B 5/0278* (2013.01); *G02B 27/01* (2013.01); *G02F 1/133603* (2013.01); *G02F 1/133606* (2013.01); *G02F 1/133611* (2013.01); *G09G 3/02* (2013.01); *B60K 2350/203* (2013.01); *B60K 2350/2052* (2013.01); *G02B 2027/0118* (2013.01); *G02F 2001/133613* (2013.01); *G09G 2380/10* (2013.01)

(56) References Cited

U.S. PATENT DOCUMENTS

| | | | |
|---|---|---|---|
| 2007/0024977 | A1 | 2/2007 | Kawamura et al. |
| 2009/0027589 | A1 | 1/2009 | Yamazoe et al. |
| 2009/0128901 | A1* | 5/2009 | Tilleman ............... G02B 26/10 359/475 |
| 2009/0213037 | A1* | 8/2009 | Schon .................... G02B 27/01 345/7 |
| 2010/0033654 | A1* | 2/2010 | Aoki ....................... G02B 7/008 349/72 |
| 2012/0224062 | A1* | 9/2012 | Lacoste ................. G01C 21/365 348/148 |
| 2012/0249974 | A1 | 10/2012 | Ogino |
| 2013/0182302 | A1* | 7/2013 | Shikii .................... B60K 35/00 359/13 |
| 2013/0194798 | A1* | 8/2013 | Yang ....................... F21V 5/007 362/237 |
| 2013/0321780 | A1 | 12/2013 | Miura |
| 2014/0022645 | A1 | 1/2014 | Matsuura et al. |
| 2014/0146290 | A1* | 5/2014 | Sieler .................... G03B 21/001 353/30 |
| 2014/0184996 | A1* | 7/2014 | Matsushita ........ G02B 27/0101 349/117 |
| 2014/0293434 | A1* | 10/2014 | Cheng ................... G02B 27/225 359/630 |
| 2015/0061976 | A1* | 3/2015 | Ferri .................... G02B 27/0101 345/9 |
| 2015/0085088 | A1* | 3/2015 | Asai .................... H04N 13/0404 348/54 |
| 2015/0262424 | A1* | 9/2015 | Tabaka ............... G02B 27/0075 345/633 |
| 2016/0124236 | A1* | 5/2016 | Kroon ................. G02B 27/2214 359/463 |
| 2016/0291325 | A1* | 10/2016 | Kasahara ........... G02B 27/0101 |
| 2016/0373733 | A1* | 12/2016 | Kroon ................. G02B 27/2214 |

FOREIGN PATENT DOCUMENTS

| | | | | |
|---|---|---|---|---|
| JP | 2007-058163 | | 3/2007 | |
| JP | 2007-108429 | | 4/2007 | |
| JP | 2010-153239 | | 7/2010 | |
| JP | 2011-090217 | | 5/2011 | |
| JP | 2012-203176 | | 10/2012 | |
| JP | 2012-203366 | | 10/2012 | |
| JP | WO 2013/035855 | * | 3/2013 | ............ G02B 27/01 |
| JP | WO 2013/035855 A | * | 3/2013 | ......... G02F 1/13363 |
| JP | 2013-251222 | | 12/2013 | |
| JP | WO 2013/035855 | * | 3/2014 | ............ G02B 27/01 |
| JP | WO 2014/148167 | * | 9/2014 | ............... F02B 27/00 |
| JP | WO 2014/148167 A | * | 9/2014 | ......... G02B 27/0101 |
| JP | WO 2015/045251 A1 | * | 4/2015 | ......... H04N 13/0409 |
| WO | WO 2014/147195 | * | 9/2014 | ............ F21S 48/1266 |

OTHER PUBLICATIONS

Extended European Search Report dated Mar. 1, 2017 in European Patent Application No. 15871297.6.
International Search Report of PCT application No. PCT/JP2015/005491 dated Dec. 22, 2015.

* cited by examiner

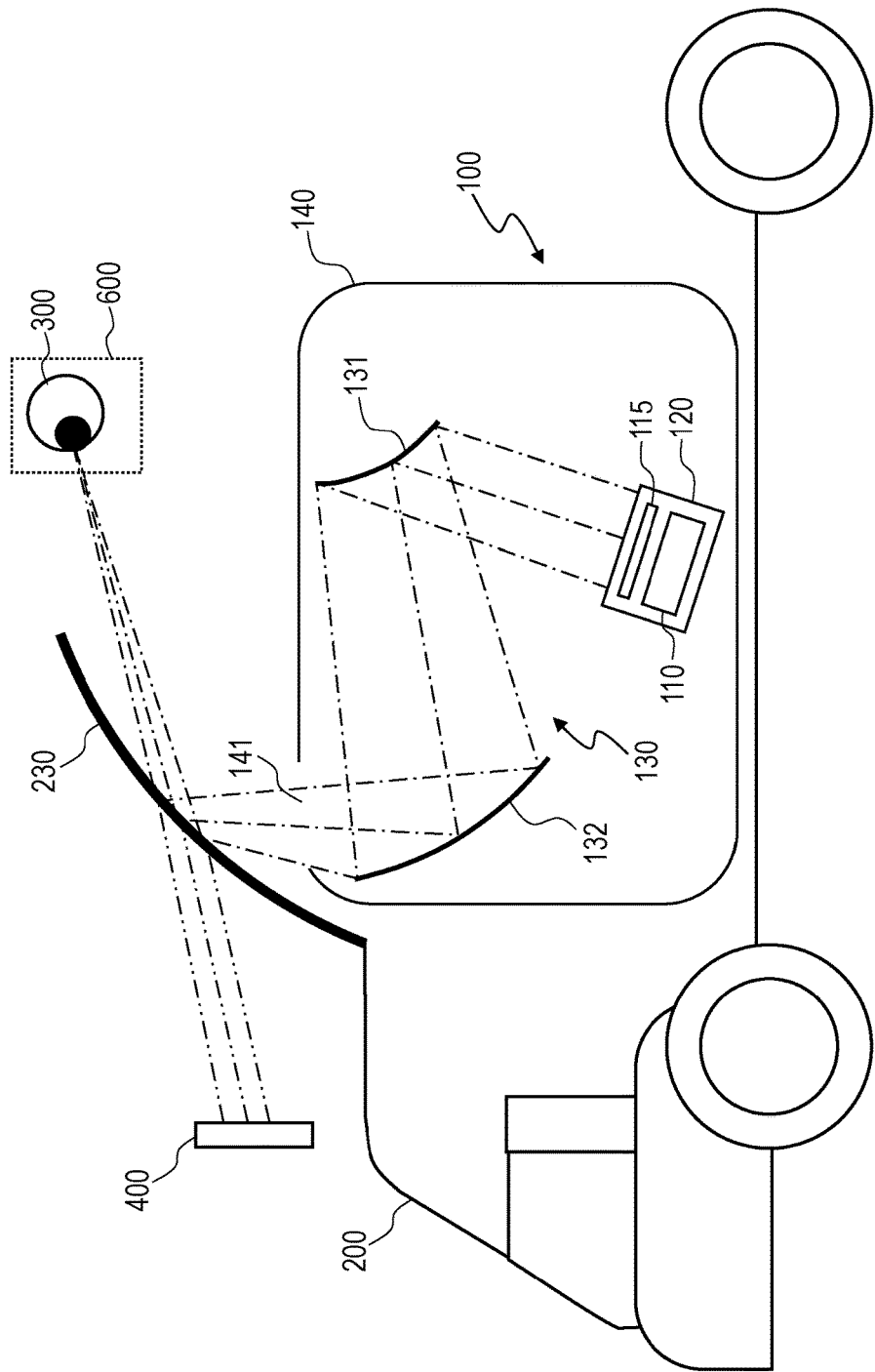

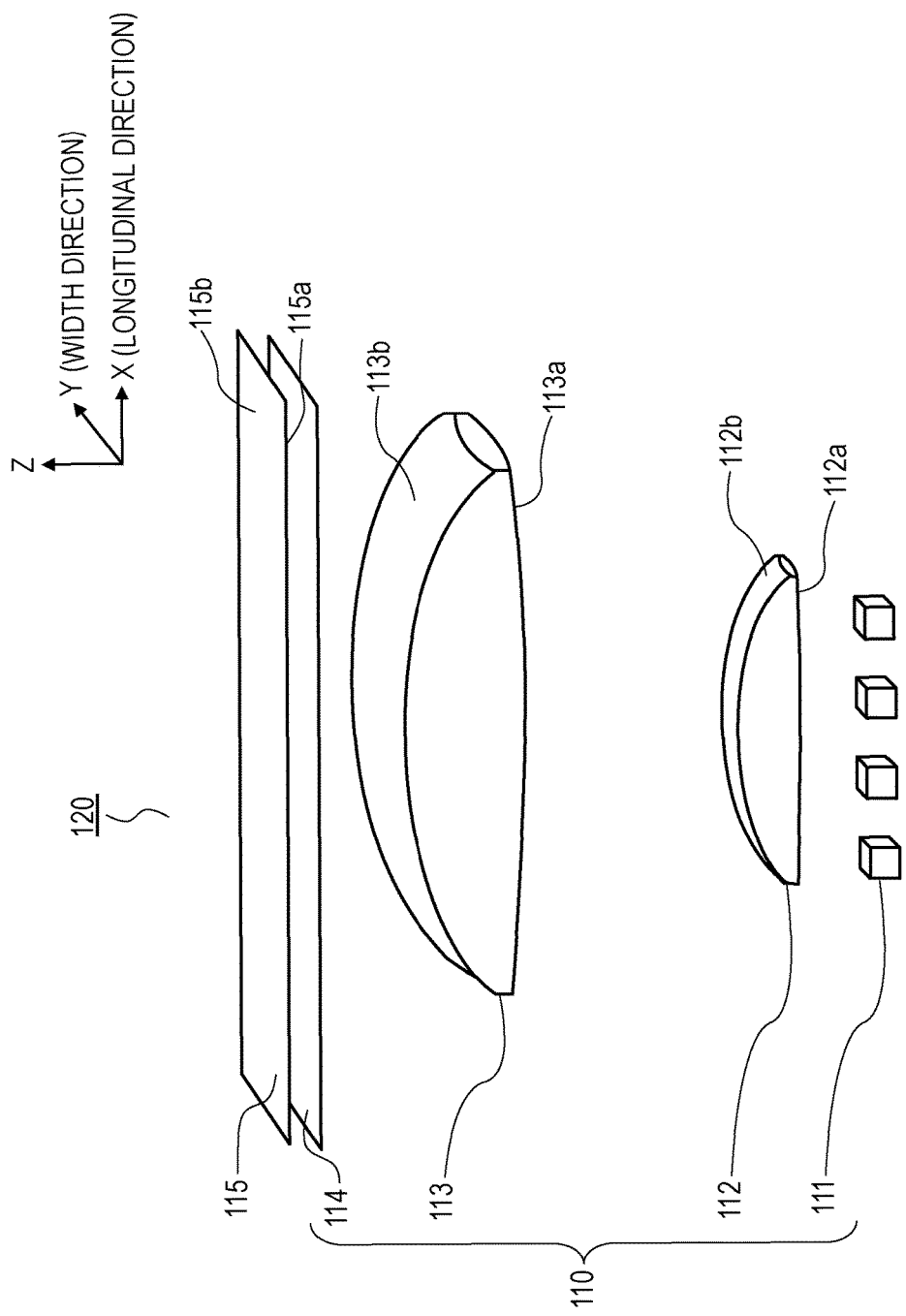

(LONG-SIDE SIDE OF LIQUID CRYSTAL PANEL)

(SHORT-SIDE SIDE OF LIQUID CRYSTAL PANEL)

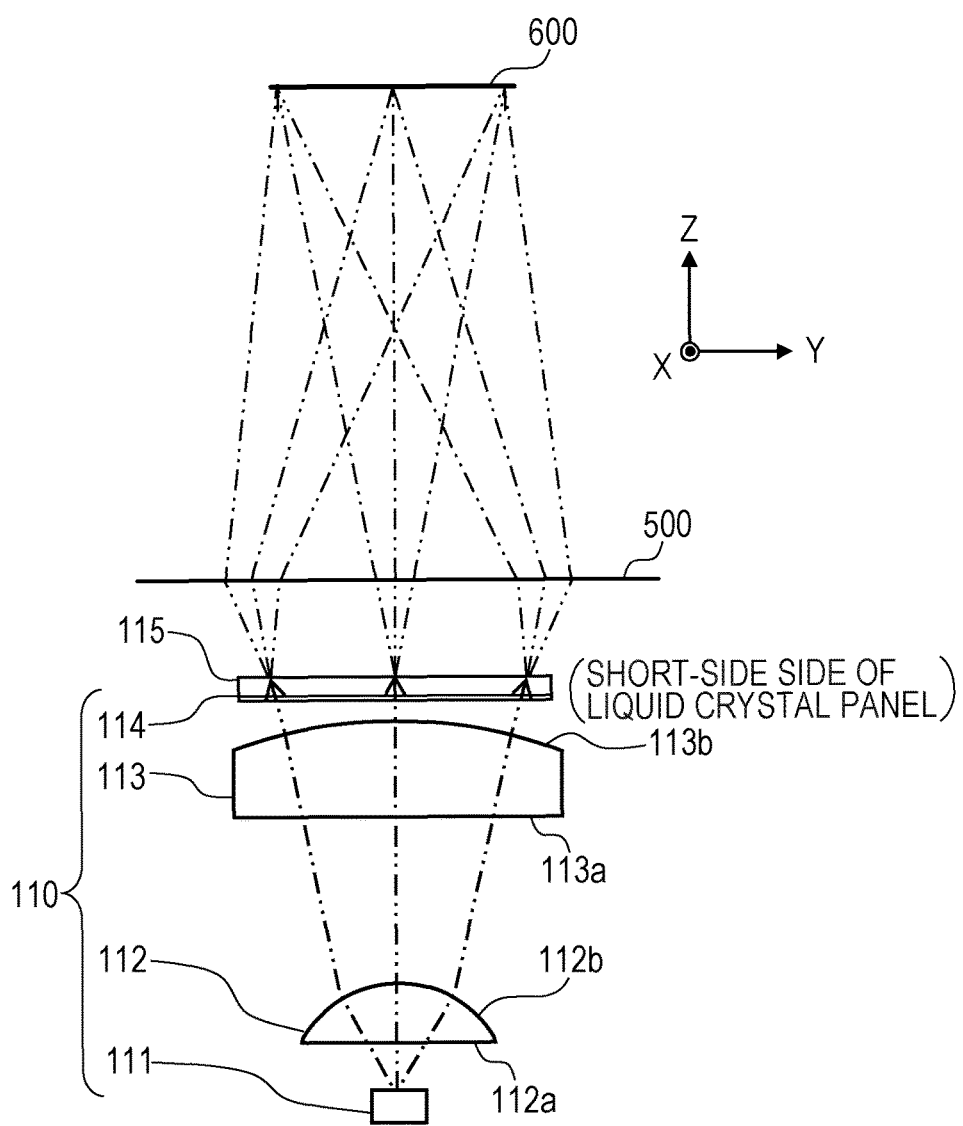

HEAD-UP DISPLAY AND MOBILE BODY EQUIPPED WITH HEAD-UP DISPLAY

BACKGROUND

1. Technical Field

The present disclosure relates to a head-up display which displays an image so that an observer can view a virtual image from an eyebox of the observer, and relates to a mobile body equipped with the head-up display.

2. Description of the Related Art

Unexamined Japanese Patent Publication No. 2007-108429 discloses a head-up display in which light emitted from a light source in a back of a liquid crystal panel is uniformed to transmission-illuminate the liquid crystal panel. The head-up display includes a light source, a first collective lens, a diffusion plate, and a second collective lens.

SUMMARY

A head-up display according to a first aspect of the present disclosure includes: a plurality of light source elements which are arranged in a first direction and emit light; a first lens which takes in from an incident surface the light emitted from the plurality of light source elements and emits the light from an emission surface; and a diffusion member disposed on a side of the emission surface of the first lens. The head-up display further includes: a spatial light modulation element which takes in from an incident surface the light having been emitted from the plurality of light source elements and having passed through the first lens and the diffusion member, modulates the taken-in light in accordance with image information, and emits the modulated light from an emission surface, and an optical element which reflects the light emitted from the spatial light modulation element. The first lens changes an optical path of light emitted from each of the light source elements such that the light emitted from the each of the light source elements reaches a same area on the incident surface of the spatial light modulation element.

In the head-up display in the present disclosure, the first lens causes the light emitted from the plurality of light source elements to illuminate the same area on the incident surface of the spatial light modulation element. With this arrangement, it is possible to display an image with reduced brightness unevenness as a displayed virtual image (image).

BRIEF DESCRIPTION OF THE DRAWINGS

FIG. 1 is a schematic diagram showing a vehicle in which a head-up display in a first exemplary embodiment is equipped.

FIG. 2 is a diagram for describing a configuration of a display unit of the head-up display in the first exemplary embodiment.

FIG. 4C is a diagram showing optical paths in the first exemplary embodiment viewed from the X-axis direction.

DETAILED DESCRIPTION

Figure 3A:
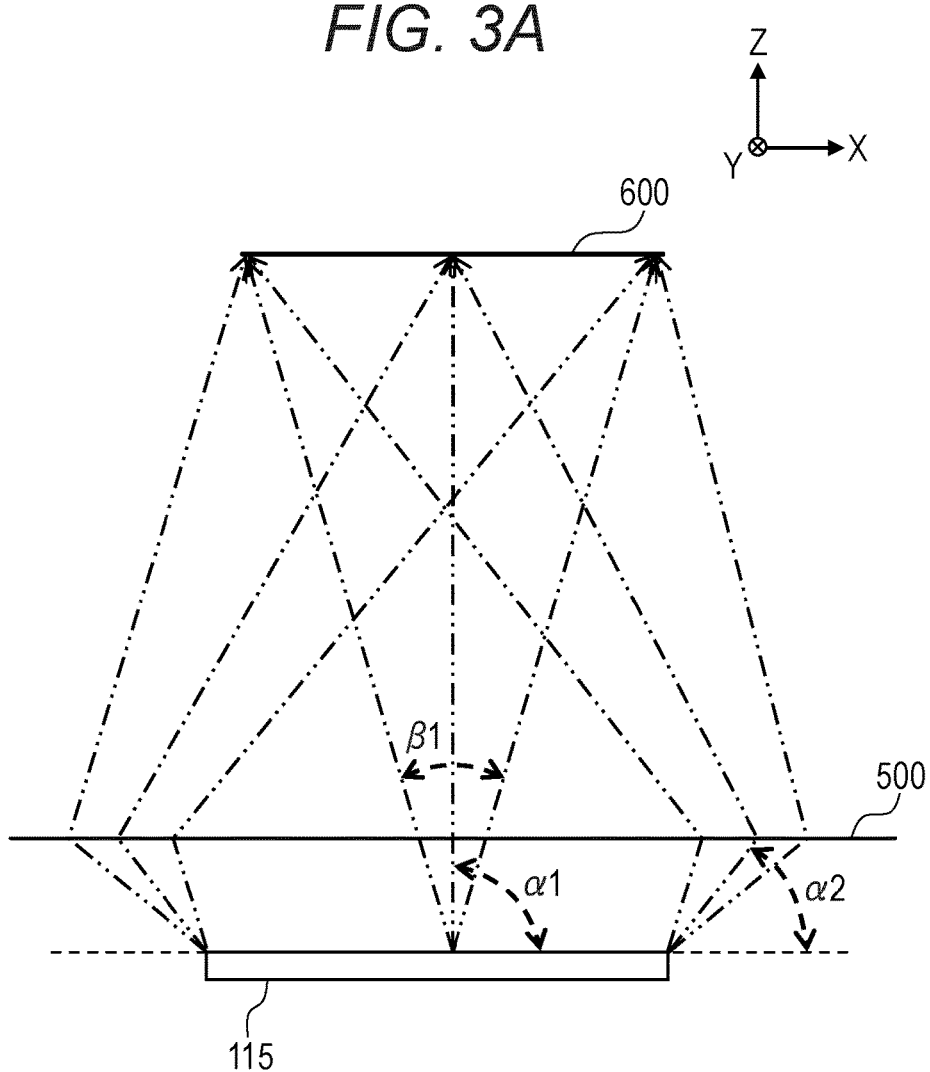
FIG. 3A is a diagram illustrating optical paths (optical paths viewed from a Y-axis direction) of the head-up display in the first exemplary embodiment.

In the following, an exemplary embodiment will be described in detail, appropriately with reference to the drawings. However, the exemplary embodiments will not be described in detail in some cases. For example, a detailed description of a well-known matter and a duplicated description of substantially the same configuration will be omitted in some cases. This is to avoid the following description from being unnecessarily redundant and thus to help those skilled in the art to easily understand the description. Note that the accompanying drawings and the following description are provided to help those skilled in the art to sufficiently understand the present disclosure, but are not intended to limit the subject matters of the claims.

First Exemplary Embodiment

In the following, a first exemplary embodiment will be described with reference to the accompanying drawings.

1-1. Configuration

[1-1-1. General Structure]

FIG. 1 is a diagram showing a configuration of a head-up display, in the first exemplary embodiment, equipped in a vehicle. Head-up display 100 is equipped in vehicle 200 (an example of a mobile body) which is equipped with windshield 230. Head-up display 100 is configured with display unit 120, reflective optical unit 130, and chassis 140. Display unit 120 includes illumination device 110 and liquid crystal panel 115.

Head-up display 100 is a device which projects an image on windshield 230 so that observer 300 can view virtual image 400.

Illumination device 110 illuminates liquid crystal panel 115, which is a display element. Liquid crystal panel 115 displays an image showing, for example, a speedometer or a numerical value indicating a speed. Liquid crystal panel 115 functions as a spatial light modulation element and modulates light from illumination device 110 in accordance with a displayed image. The modulated light is emitted from liquid crystal panel 115 as transmitted light. The transmitted light is introduced into eyebox 600 of observer 300 through reflective optical unit 130 and windshield 230 and is viewed by observer 300 as virtual image 400. For example, the observer can view an image of a speedometer or the like as virtual image 400. Here, eyebox 600 is an area in which observer 300 can view the entire virtual image.

Reflective optical unit 130 (an example of an optical element) includes first mirror 131 and second mirror 132. First mirror 131 reflects the light emitted from liquid crystal panel 115 toward second mirror 132. Second mirror 132 reflects the light from first mirror 131 toward windshield 230. A reflection surface of second mirror 132 has a concave shape. Reflective optical unit 130 is not necessarily made up of two mirrors, and may be configured with one mirror or three or more mirrors. Further, a refractive optical system such as a lens may be additionally disposed on an optical path of reflective optical unit 130.

Chassis 140 of head-up display 100 contains display unit 120 and reflective optical unit 130 and has opening 141 through which the light from reflective optical unit 130 is emitted. Opening 141 may be provided with a transparent cover.

[1-1-2. Configuration of Display Unit]

FIG. 2 is a diagram showing a detailed configuration of display unit 120. Display unit 120 includes illumination device 110 and liquid crystal panel 115. Liquid crystal panel 115 has incident surface 115a through which light enters, and has emission surface 115b through which light is emitted. Incident surface 115a has the same shape as emission surface 115b, which shape is rectangular.

Note that, in the following description, three-dimensional orthogonal coordinate systems are set in the drawings. Specifically, the X-axis is set in a direction parallel to a longitudinal direction of incident surface 115a and emission surface 115b of liquid crystal panel 115, the Y-axis is set in a direction parallel to a width direction of incident surface 115a and emission surface 115b, and the Z-axis is set in the normal direction of incident surface 115a and emission surface 115b. Note that the X-axis direction (longitudinal direction) is an example of a first direction, the Y-axis direction (width direction) is an example of a second direction.

As shown in FIG. 2, illumination device 110 is configured with a plurality of light source elements 111, first lens 112 disposed in an emitting direction of light source elements 111, second lens 113 disposed in an emitting direction of first lens 112, and diffusion plate 114 (an example of a diffusion member) disposed in an emitting direction of second lens 113.

Light source elements 111 are, for example, chip light emitting diodes (LEDs) and are light emitting bodies which supply illumination light to liquid crystal panel 115. The plurality of light source elements 111 are arranged in a row in the longitudinal direction (the X direction in FIG. 3A) of liquid crystal panel 115.

First lens 112 is disposed close to each of light source elements 111 to such an extent that the emitted light from each of light source elements 111 does not leak. First lens 112 takes in the emitted light from each of light source elements 111 from incident surface 112a. Further, first lens 112 has a function to deflect diffused light from light source elements 111 so that the light becomes approximately parallel light in the Y direction, and has a function to emit the light. Further, only one first lens 112 is disposed for the plurality of light source elements 111.

At least any one of incident surface 112a and emission surface 112b of first lens 112 has a convex shape so that first lens 112 has a positive refractive power. Note that the convex shapes of incident surface 112a and emission surface 112b of first lens 112 do not need to be rotationally symmetric about an optical axis, and may have toroidal shapes having different curvatures in the X direction and in the Y direction. In the present exemplary embodiment, first lens 112 is a plano-convex lens in which only emission surface 112b has a convex shape.

Emission surface 112b of first lens 112 has a convex surface in an aspherical surface shape having different curvatures in the X-axis direction and in the Y-axis direction. A shape of emission surface 112b in the X-axis direction has a curvature which is smaller (or a curvature radius is larger) in a direction from the center to the edge so that an illuminance distribution on diffusion plate 114 of the emitted light from each of light source elements 111 is uniform. Further, a shape of emission surface 112b in the Y-axis direction has a curvature which is smaller on the edge part than on the central part so that the illuminance distribution is uniform on diffusion plate 114.

Second lens 113 has a function to deflect the emitted light from first lens 112 to an intended direction. In the present exemplary embodiment, incident surface 113a of second lens 113 has a convex shape only in the X-axis direction. Further, emission surface 113b of second lens 113 has a convex shape which has different curvatures in the X-axis direction and in the Y-axis direction. However, incident surface 113a of second lens 113 may have a convex shape which has different curvatures in the X-axis direction and in the Y-axis direction. Further, emission surface 113b of second lens 113 may have a convex shape only in one of the X-axis direction and the Y-axis direction. A refractive power of second lens 113 is set depending on an emission angle (or an incident angle of incident light into diffusion plate 114) of emitted light on an edge part of display unit 120. However, second lens 113 does not necessarily need to be provided. If a distance between first lens 112 and diffusion plate 114 is set long, it is possible to achieve an intended emission angle on the edge part of display unit 120 with only first lens 112, without second lens 113.

First lens 112 and second lens 113 are each made of a transparent material having a predetermined refractive index. The refractive index of the transparent material is approximately 1.4 to 1.6, for example. As such a transparent material, it is possible to use resin such as an epoxy resin, a silicone resin, an acrylic resin, and a polycarbonate. In the present exemplary embodiment, the polycarbonate is used in consideration of heat resistance properties.

Diffusion plate 114 diffuses the light deflected by first lens 112 and second lens 113 and emits the diffused light toward liquid crystal panel 115. This arrangement can reduce brightness unevenness of video light which is generated by the plurality of light source elements 111 and which is to be viewed in eyebox 600. Diffusion plate 114 only has to be made of optical material having a light diffusing function, and a surface of the plate is made of bead members or is made to have a fine concavo-convex structure or a rough surface, for example. Alternatively, a dotted sheet or a permeable milky white sheet may be used.

[1-1-3. Optical Path in Head-Up Display]

In the following, a description will be given on an optical path of light emitted from light source elements 111 in head-up display 100 of the present exemplary embodiment.

Figure 3B:
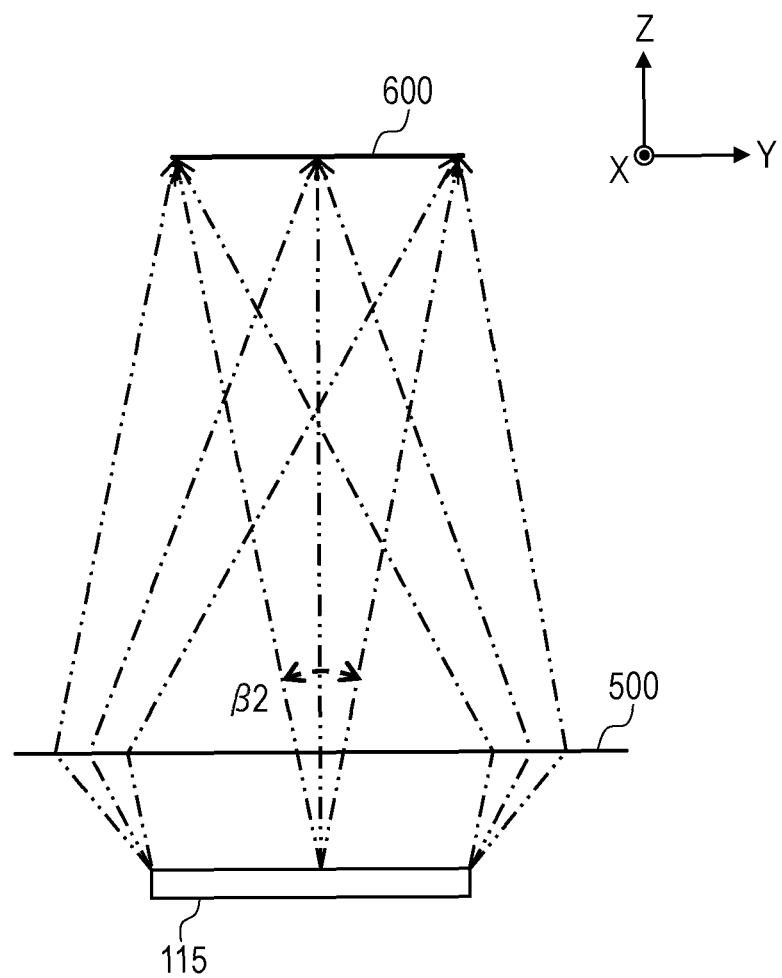
FIG. 3B is a diagram illustrating optical paths (optical paths viewed from the X-axis direction) of the head-up display in the first exemplary embodiment.

FIG. 3A and FIG. 3B are diagrams showing optical paths from liquid crystal panel 115 to eyebox 600 in head-up display 100. Observer 300 views the transmitted light of liquid crystal panel 115 through virtual image optical system 500. Virtual image optical system 500 is a combination of reflective optical unit 130 and windshield 230 shown in FIG. 1, and is an example of an optical element. FIG. 3A shows the optical paths of liquid crystal panel 115 viewed from a long-side side, and FIG. 3B shows the optical paths of liquid crystal panel 115 viewed from a short-side side.

In a case where liquid crystal panel 115 is disposed such that incident surface 115a of liquid crystal panel 115 is parallel to an emission surface of illumination device 110, the emitted light directed from liquid crystal panel 115 toward a center of eyebox 600 is emitted at different emission angles on a central part and on an edge part of liquid crystal panel 115. Specifically, emission angle $\alpha 1$ on the central part of liquid crystal panel 115 is larger than emission angle $\alpha 2$ on the edge part of liquid crystal panel 115. In concrete, the emitted light on the central part of liquid crystal panel 115 is emitted in a normal direction of emission surface 115b of liquid crystal panel 115, and on the other hand, the emitted light on the edge part is emitted outward of emission surface 115b of the liquid crystal panel 115. In a case where liquid crystal panel 115 is not disposed parallel to illumination device 110, this does not apply, and the emitted light on the central part is inclined with respect to the normal direction of emission surface 115b of liquid crystal panel 115. Further, because eyebox 600 is normally longer in the X direction than in the Y direction, the light distribution angle $\beta 1$ (see FIG. 3A) in the X-axis direction is larger than the light distribution angle $\beta 2$ (see FIG. 3B) in the Y-axis direction.

Figure 4A:
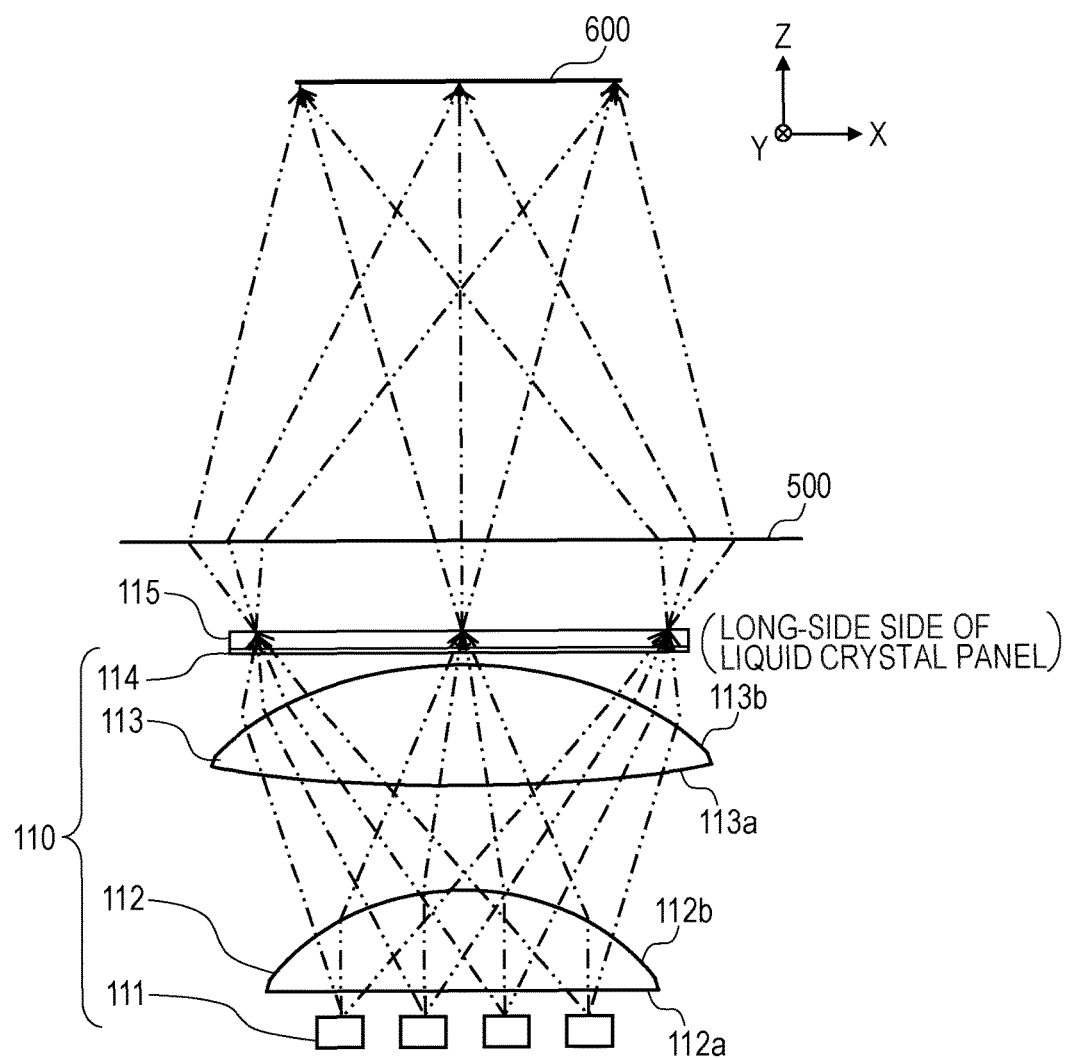
FIG. 4A is a diagram showing optical paths in the first exemplary embodiment viewed from the Y-axis direction.

FIG. 4A is a diagram showing optical paths from light source elements 111 to eyebox 600 viewed from the Y-axis direction. First lens 112 deflects the emitted light from each of light source elements 111 so that each emitted light from the plurality of light source elements 111 is superposed at a position on diffusion plate 114.

Figure 4B:
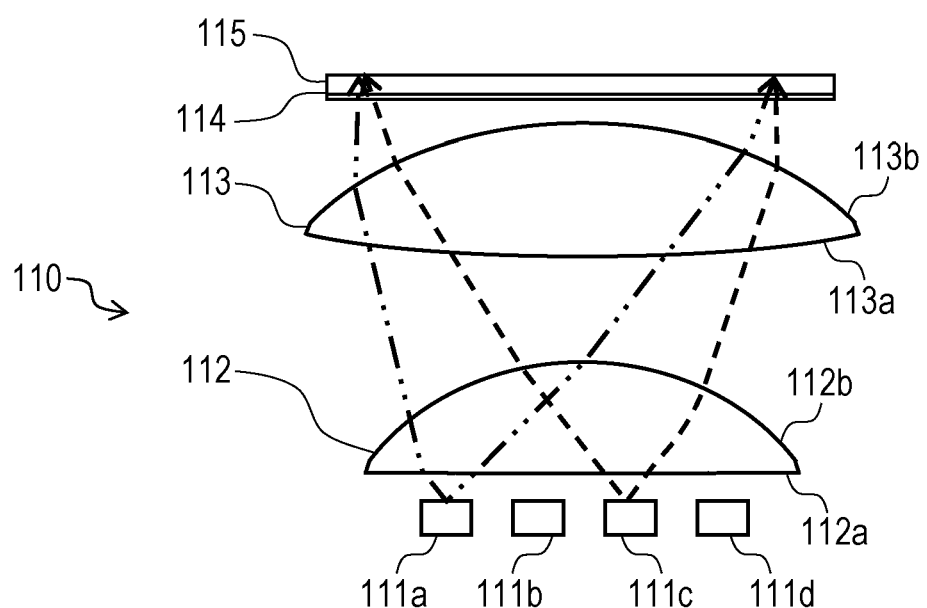
FIG. 4B is a diagram for illustrating optical paths (optical paths viewed from the X-axis direction) of the light source elements.

That is, the refractive power of first lens 112 is set so that each of the plurality of light source elements 111 illuminates the entire surface of liquid crystal panel 115 when viewed from the Y-axis direction. For example, as shown in FIG. 4B, the emitted light from light source element 111a and the emitted light from light source element 111c both illuminate the entire area of liquid crystal panel 115. Other light source elements 111b and 111d also illuminate in the same way.

In this manner, a light beam from each of the plurality of light source elements 111 is applied to the entire liquid crystal panel 115 (the same area) in a superposed manner. Thus, the brightness of virtual image 400 which can be viewed in eyebox 600 is uniform.

A focal length of first lens 112 is set so that the emitted light from each of light source elements 111a to 111d is applied to the same area of liquid crystal panel 115 in a superposed manner. Specifically, first lens 112 is designed to have the focal length which has the same value as a distance from an optical center of first lens 112 to liquid crystal panel 115.

Note that, if the emitted light from each of the plurality of light source elements 111 can be applied to approximately the same area of liquid crystal panel 115 in a superposed manner, the focal length of first lens 112 may be designed to have a value larger than the distance from the optical center of first lens 112 to liquid crystal panel 115.

Second lens 113 is used to adjust an incident angle of the emitted light from first lens 112 into liquid crystal panel 115. In other words, second lens 113 deflects the emitted light from first lens 112 in a direction inclined to predetermined angles. These predetermined angles are the angles with which it is possible to obtain the emission angles on the central part and the edge part of the liquid crystal panel 115 shown in FIG. 3A and FIG. 3B. That is, the refractive power of second lens 113 is set so that the emission angles are set appropriate to virtual image optical system 500. As described above, second lens 113 is not essential.

Diffusion plate 114 has a function to weaken orientation of the light of the plurality of light source elements 111 and to smooth the light distribution characteristics of the emitted light of liquid crystal panel 115. The light beam of each of the plurality of light source elements 111 enters diffusion plate 114 at a different angle depending on a position at which the each of light source elements 111 is placed. Therefore, the light can have a larger light distribution angle than diffusion characteristics of diffusion plate 114 in the X-axis direction, with respect to in the Y-axis direction. Note that the light distribution angle of the emitted light of liquid crystal panel 115 can be controlled by changing the arrangement of the plurality of light source elements 111. Therefore, in order to increase the light distribution angle, intervals between light source elements 111 may be increased. However, the intervals need to be increased to such an extent that the emitted light of light source elements 111 fully enters first lens 112 without leaking outside.

FIG. 4C is a diagram showing the optical paths from light source elements 111 to eyebox 600 when viewed from the X-axis direction. The emitted light of light source elements 111 enters first lens 112, and second lens 113 deflects the light to such an extent that the light is directed outward. In the present exemplary embodiment, virtual image 400 has a long side (a side extends in the longitudinal direction of liquid crystal panel 115) and a short side (a side extends in the width direction of liquid crystal panel 115). The refractive powers of first lens 112 and second lens 113 are set so that the light distribution angle of the emitted light of liquid crystal panel 115 is narrower in the Y-axis direction representing the short side direction of illumination device 110 than in the X-axis direction.

Diffusion plate 114 has a function to diffuse the light entering therein according to the predetermined light distribution characteristics (diffusion angle) and to emit the diffused light. The light distribution characteristics are set so that the light having been emitted from diffusion plate 114 and having passed through virtual image optical system 500 finally has broadness corresponding to the width of eyebox 600. Note that, in a case where the light distribution characteristics of diffusion plate 114 are set to achieve the broadness corresponding to the width in the Y-axis direction of eyebox 600, the light distribution characteristics in the X-axis direction cannot be perfectly smoothed in some cases. In that case, as a material of diffusion plate 114, an anisotropic material having diffusibility (diffusion angle) which is different between in the X-axis direction and in the Y-axis direction may be used. Alternatively, it is also possible to adjust intervals at which the plurality of light source elements 111 are arranged.

Figure 5A:
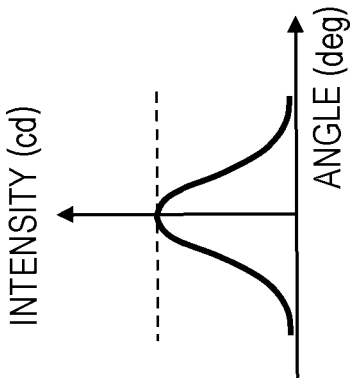
FIG. 5A is a graph showing a distribution (on a central part in the X-axis direction) of emitted light of the display unit (liquid crystal panel) in the first exemplary embodiment.
Figure 5B:
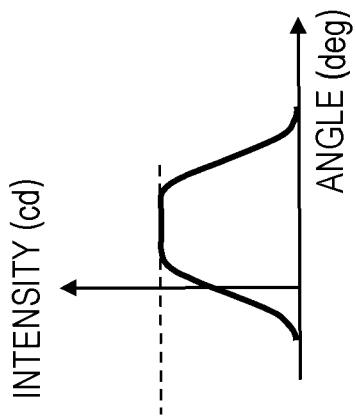
FIG. 5B is a graph showing a distribution (on an edge part in the X-axis direction) of the emitted light of the display unit (liquid crystal panel) in the first exemplary embodiment.
Figure 5C:
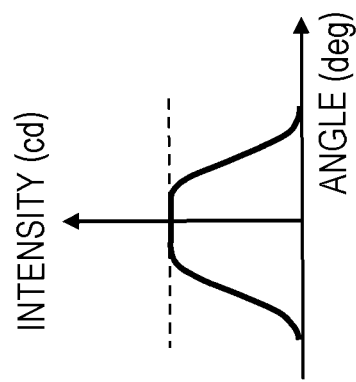
FIG. 5C is a graph showing a distribution (on a central part of the Y-axis direction) of the emitted light of the display unit (liquid crystal panel) in the first exemplary embodiment.

FIG. 5A is a graph showing the light distribution characteristics of the emitted light on the central part in the X-axis direction, which is the longitudinal direction of liquid crystal panel 115 in the present exemplary embodiment. FIG. 5B is a graph showing the light distribution characteristics of the emitted light on the edge part in the X-axis direction, which is the longitudinal direction of liquid crystal panel 115 in the present exemplary embodiment. FIG. 5C is a graph showing the light distribution characteristics of the emitted light on the central part in the Y-axis direction, which is the width direction of liquid crystal panel 115 in the present exemplary embodiment. The vertical axes of the graphs shown in FIG. 5A to FIG. 5C represent light intensity of liquid crystal panel 115, where a unit is candela. The horizontal axes represent the light distribution angle of liquid crystal panel 115, where a unit is degree.

With reference to FIG. 5A and FIG. 5B, the drawings show that, on the central part of liquid crystal panel 115, the intensity of the emitted light has a peak in the normal direction of emission surface 115b of liquid crystal panel 115, however, the drawings also show that, on the edge part of liquid crystal panel 115, the intensity of the emitted light has a peak in a direction inclined outward of liquid crystal panel 115 on the basis of the normal direction. Further, as shown in FIG. 5A and FIG. 5C, in liquid crystal panel 115 of the present exemplary embodiment, the light distribution angle in the X-axis direction is larger than the light distribution angle in the Y-axis direction. This arrangement makes it possible that, in head-up display 100 which displays virtual image 400 larger than the area of liquid crystal panel 115, virtual image having a uniform brightness distribution is viewed in eyebox 600.

1-2. Advantageous Effect and the Like

As described above, in the present exemplary embodiment, head-up display 100 includes: the plurality of light source elements 111 which are arranged in the X-axis direction (the first direction) and emit light; first lens 112 which takes in from incident surface 112a the light emitted from the plurality of light source elements 111 and emits the light from emission surface 112b; diffusion plate (an example of the diffusion member) 114 disposed on the side of emission surface 112b of first lens 112; liquid crystal panel (an example of the spatial light modulation element) 115 which takes in from incident surface 115a the light having been emitted from the plurality of light source elements 111 and having passed through first lens 112 and diffusion plate 114, modulates the taken-in light in accordance with image information, and emits the modulated light from emission surface 115b; and reflective optical unit 130 which reflects the light emitted from liquid crystal panel 115. First lens 112 changes an optical path of light emitted from each of light source elements 111 such that the light emitted from the each of light source elements 111 reaches the same area on incident surface 115a of liquid crystal panel 115.

With this configuration, the emitted light from each of light source elements 111 reaches the same area on the incident surface of liquid crystal panel 115. That is, since the light from each of light source elements 111 illuminates the same area on liquid crystal panel 115, and the illumination is performed without brightness unevenness. Thus, the brightness of virtual image 400 which can be viewed in eyebox 600 is uniform.

Other Exemplary Embodiments

In the above, the first exemplary embodiment is described as an example of the technique to be disclosed in the present application. However, the technique in the present disclosure is not limited to the above and can apply to exemplary embodiment in which modification, replacement, addition, and removal are made. Further, the components described in the above exemplary embodiment can be combined to make a new exemplary embodiment. Thus, other exemplary embodiments will be exemplified below.

In the above exemplary embodiment, liquid crystal panel 115 is used as the spatial light modulation element; however, other display elements can be used as long as the display elements are transmissive displays. Further, in the above description, an example is shown in which liquid crystal panel 115 is disposed perpendicular to principal light beams of light source elements 111; however, liquid crystal panel 115 may be disposed being inclined instead of being perpendicular.

As the emission surfaces and the incident surfaces of first lens 112 and second lens 113, Fresnel lenses may be used. This arrangement can make the lenses thinner. Further, as long as the emitted light from each of the plurality of light source elements 111 is applied to approximately the same area of liquid crystal panel 115 in a superposed manner, the focal length of first lens 112 may be set to a value greater than the distance from the optical center of first lens 112 to emission surface 113b of second lens 113. This arrangement can also generate a virtual image with reduced brightness unevenness.

Figure 6:
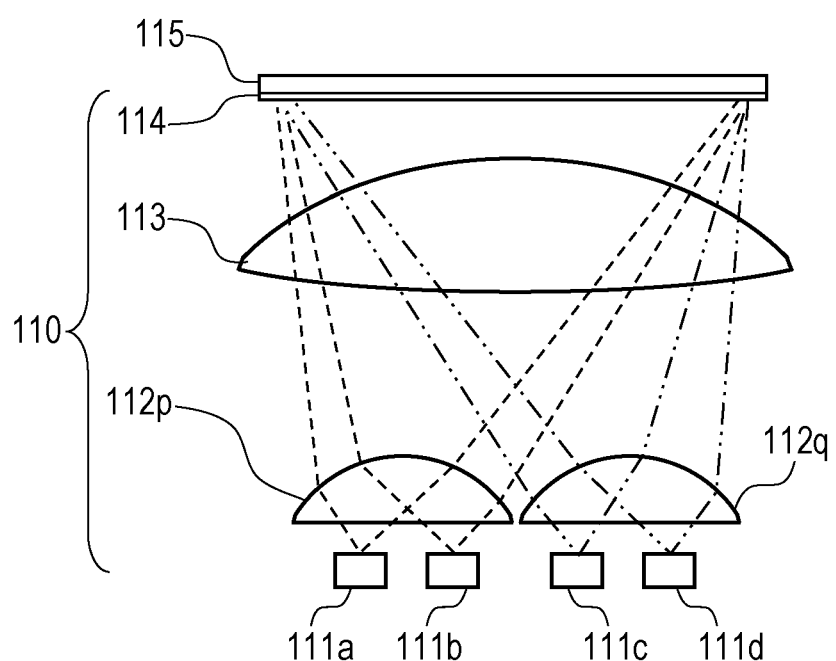
FIG. 6 is a diagram showing an example of another configuration of the display unit.

In the above exemplary embodiment, one first lens 112 is disposed for the plurality of light source elements 111; however, a plurality of first lenses may be disposed for the plurality of light source elements 111. FIG. 6 shows a configuration example of illumination device 110, in which two first lenses 112p and 112q are disposed for the plurality of light source elements 111. In this case, optical characteristics (focal lengths) of first lenses 112p and 112q are designed so that light from each of light source elements 111 illuminates the entire liquid crystal panel 115. Also with this configuration, a virtual image with small brightness unevenness can be viewed in eyebox 600.

As first lens 112, a convex lens is used; however, a TIR (Total Internal Reflection) lens may be used. With this arrangement, the light from light source elements 111 can be efficiently emitted to second lens 113, and light utilization efficiency can be improved.

Figure 7A:
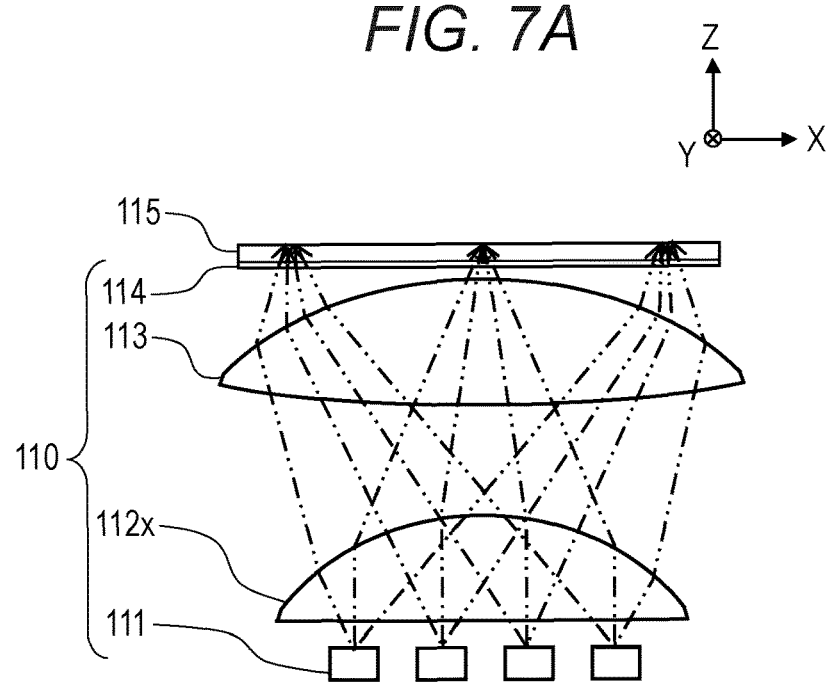
FIG. 7A is a diagram showing a configuration (a configuration viewed from the Y-axis direction) of an illumination device using a TIR lens.
Figure 7B:
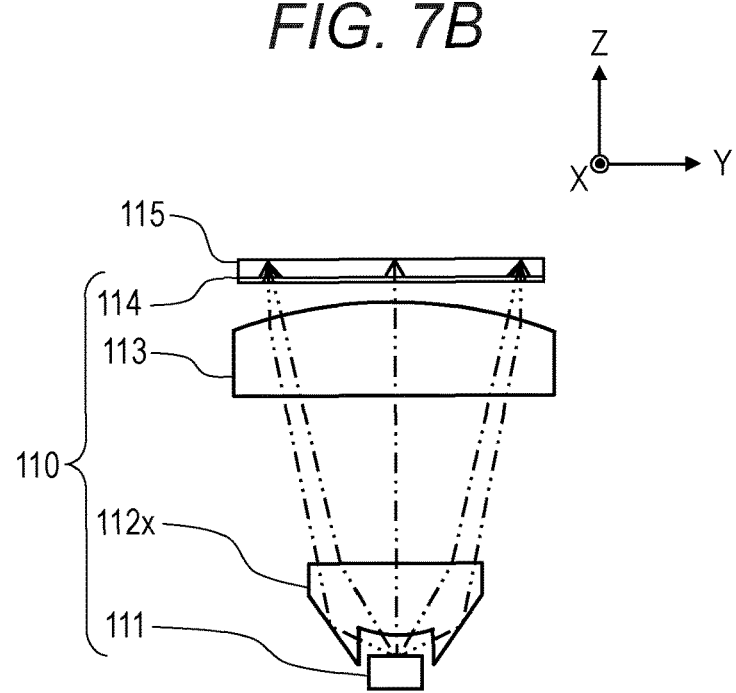
FIG. 7B is a diagram showing a configuration (a configuration viewed from the X-axis direction) of the illumination device using a TIR lens.

FIG. 7A and FIG. 7B are diagrams showing a configuration example of illumination device 110 in which TIR lens 112x is used as the first lens. FIG. 7A is a diagram showing the configuration example of illumination device 110 when viewed from the Y-axis direction (the width direction of liquid crystal panel 115), and FIG. 7B is a diagram showing the configuration example of illumination device 110 when viewed from the X-axis direction (the longitudinal direction of liquid crystal panel 115).

As shown in FIG. 7B, in the present exemplary embodiment, TIR lens 112x is disposed so as to take in leakage light in the Y-axis direction (the width direction of the emitted light of light source elements 111). With this arrangement, the leakage light of the emitted light of light source elements 111 in the Y-axis direction can be taken in, and the light utilization efficiency can be thus improved.

In the above exemplary embodiment, light source elements 111 are arranged, in illumination device 110, only in a single row in the Y-axis direction (the width direction of liquid crystal panel 115); however, light source elements 111 may be arranged in a plurality of rows in the Y-axis direction. In the above exemplary embodiment, diffusion plate 114 is disposed between second lens 113 and liquid crystal panel 115; however, diffusion plate 114 may be disposed between first lens 112 and second lens 113. This arrangement is less efficient, but even diffusion plate 114 in this position can also reduce the brightness unevenness.

As a member for reflecting the emitted light of head-up display 100, windshield 230 is exemplified; however, the member is not limited to this, and a combiner may be used.

As the light source, LEDs are exemplified; however, laser diodes, organic light-emitting diodes, or the like may be used.

In the above exemplary embodiment, first lens 112 is described with reference to the example in which each of light source elements 111 illuminates the entire area of liquid crystal panel 115; however, the light from each of light source elements 111 may only be superposed on liquid crystal panel 115 and may not be applied to the entire surface of liquid crystal panel 115.

A mobile body on which head-up display 100 of the present exemplary embodiment is equipped is not limited to an automotive vehicle but includes a railroad vehicle, a motorbike, an aircraft, a helicopter, a ship, or other various kind of devices which carry people.

The present disclosure can be applied to a projection device with which a virtual image is viewed. Specifically, the present disclosure can be applied to a head-up display and the like.

What is claimed is:

1. A head-up display comprising:
   a plurality of light source elements which are arranged in a plane in a first direction and emit light;
   a first lens which receives through a single incident surface the light emitted from the plurality of light source elements and emits the light from a single emission surface of the first lens;
   a diffusion member disposed on an emission surface side of the first lens;
   a spatial light modulation element which takes in from an incident surface the light having been emitted from the plurality of light source elements and having passed through the first lens and the diffusion member, modulates the taken-in light in accordance with image information, and emits the modulated light from an emission surface of the spatial light modulation element; and
   an optical element which reflects the light emitted from the spatial light modulation element,
   wherein the first lens changes an optical path of the light emitted from each of the plurality of light source elements such that the light emitted from all of the plurality of light source elements are superimposed on a predetermined point on the incident surface of the spatial light modulation element,
   a light distribution of the modulated light emitting from an edge portion of the spatial light modulation element is outward with respect to a light distribution of the modulated light emitting from a central portion of the spatial light modulation element, and
   a first emission angle of the modulated light on the central portion of the emission surface of the spatial light modulation element is larger than a second emission angle of the modulated light on the edge portion of the emission surface of the spatial light modulation element.

2. The head-up display according to claim 1, wherein a focal length, in the first direction, of the first lens is set to a value equal to or greater than a distance from an optical center of the first lens to the spatial light modulation element.

3. The head-up display according to claim 1, wherein a curvature, in the first direction, of the emission surface of the first lens is smaller on an edge part of the emission surface of the first lens than on a central part of the emission surface of the first lens.

4. The head-up display according to claim 1, wherein a curvature of the emission surface of the first lens in the first direction is different from a curvature of the first lens in a second direction perpendicular to the first direction.

5. The head-up display according to claim 1, wherein a curvature, of the emission surface of the first lens, in a second direction perpendicular to the first direction, is smaller on an edge part of the emission surface of the first lens than on a central part of the emission surface of the first lens.

6. The head-up display according to claim 1, further comprising a second lens which is disposed on the emission surface side of the first lens and has an incident surface and an emission surface,
   wherein at least one of the incident surface and the emission surface of the second lens is a convex surface.

7. The head-up display according to claim 6, wherein a curvature of the emission surface of the second lens in the first direction is different from a curvature of the first lens in a second direction perpendicular to the first direction.

8. The head-up display according to claim 1, wherein a first focal length, in the first direction, of the first lens is smaller than a second focal length, in a second direction perpendicular to the first direction, of the first lens.

9. The head-up display according to claim 1, wherein the first lens changes an optical path of the light emitted from each of the plurality of light source elements such that the light emitted from the each of the plurality of light source elements illuminates an entire area of the incident surface of the spatial light modulation element.

10. The head-up display according to claim 1, wherein the head-up display is equipped in a mobile body having a windshield.

11. The head-up display according to claim 1, wherein the optical element comprises a virtual image optical system including a windshield, a first mirror, and a second mirror.

12. The head-up display according to claim 11, wherein the first mirror is a convex mirror.

13. The head-up display according to claim 12, wherein the second mirror is a concave mirror.

14. The head-up display according to claim 13, wherein the windshield is convex at an incident surface.

15. The head-up display according to claim 1, wherein the light emitted from at least some of the plurality of light source elements are incident on a same surface of the first lens.

16. The head-up display according to claim 1, wherein the light emitted from the plurality of light source elements are incident on a same surface of the first lens.

17. The head-up display according to claim 1, wherein a first light distribution angle of the modulated light in an X-axis direction of the spatial light modulation element is larger than a second light distribution angle of the modulated light in a Y-axis direction of the spatial light modulation element.

18. A mobile body comprising a head-up display, the head-up display including:
   a plurality of light source elements which are arranged in a plane in a first direction and emit light;
   a first lens which receives through a single incident surface the light emitted from the plurality of light source elements and emits the light from a single emission surface of the first lens;
   a diffusion member disposed on an emission surface side of the first lens;
   a spatial light modulation element which takes in from an incident surface the light having been emitted from the plurality of light source elements and having passed through the first lens and the diffusion member, modulates the taken-in light in accordance with image information, and emits the modulated light from an emission surface of the spatial light modulation element, and an optical element which reflects the light emitted from the spatial light modulation element, wherein the first lens changes an optical path of the light emitted from each of the plurality of light source elements such that the light emitted from all of the plurality of light source elements are superimposed on a predetermined point on the incident surface of the spatial light modulation element, a light distribution of the modulated light emitting from an edge portion of the spatial light modulation element is outward with respect to a light distribution of the modulated light emitting from a central portion of the spatial light modulation element, and a first emission angle of the modulated light on the central portion of the emission surface of the spatial light modulation element is larger than a second emission angle of the modulated light on the edge portion of the emission surface of the spatial light modulation element.

19. A backlight device for use in a head-up display including a spatial light modulation element and an optical reflection element, the spatial light modulation element including an incident surface and an emission surface, the spatial light modulation element configured to take in through the incident surface light emitted from a plurality of light source elements and having passed through a first lens and a diffusion member, to modulate the taken-in light in accordance with image information, and emit the modulated taken-in light from the emission surface, the optical reflection element configured to reflect the modulated taken-in light emitted from the spatial light modulation element, the backlight device comprising:

a plurality of light source elements which are arranged in a first direction and emit light;

a first lens which receives through a single incident surface the light emitted from the plurality of light source elements and emits the light from a single emission surface of the first lens; and a diffusion member disposed on an emission surface side of the first lens, wherein the first lens changes an optical path of the light emitted from each of the plurality of light source elements such that the light emitted from all of the plurality of light source elements are superimposed on a predetermined point on the incident surface of the spatial light modulation element, the first lens changes an optical path of the light emitting from each of the plurality of light source elements such that a light distribution of the taken-in modulated light emitting from an edge portion of the spatial light modulation element is outward with respect to a light distribution of the taken-in modulated light emitting from a central portion of the spatial light modulation element, and a first emission angle of the modulated taken-in light on the central portion of the emission surface of the spatial light modulation element is larger than a second emission angle of modulated taken-in light on the edge portion of the emission surface of the spatial light modulation element.

* * * * *